United States Patent [19]

Brothers

[11] Patent Number: 4,700,780
[45] Date of Patent: Oct. 20, 1987

[54] METHOD OF REDUCING FLUID LOSS IN CEMENT COMPOSITIONS WHICH MAY CONTAIN SUBSTANTIAL SALT CONCENTRATIONS

[75] Inventor: Lance E. Brothers, Ninnekah, Okla.

[73] Assignee: Halliburton Services, Duncan, Okla.

[21] Appl. No.: 31,493

[22] Filed: Mar. 27, 1987

[51] Int. Cl.$^4$ ............................................. E21B 33/14
[52] U.S. Cl. ...................... 166/293; 106/90; 523/130
[58] Field of Search ................ 166/283, 293; 106/90, 106/314; 175/72; 523/130

[56] References Cited

U.S. PATENT DOCUMENTS

| | | | |
|---|---|---|---|
| 3,319,716 | 5/1967 | Dill | 166/283 X |
| 4,015,991 | 4/1977 | Persinski et al. | 106/90 |
| 4,107,057 | 8/1978 | Dill et al. | 166/283 X |
| 4,500,357 | 2/1985 | Brothers et al. | 166/293 X |
| 4,515,635 | 5/1985 | Rao et al. | 106/90 |
| 4,557,763 | 12/1985 | George et al. | 166/293 X |
| 4,626,285 | 12/1986 | Peiffer et al. | 166/293 X |
| 4,632,186 | 12/1986 | Boncan et al. | 166/293 |
| 4,640,942 | 2/1987 | Brothers | 523/130 |
| 4,655,838 | 4/1987 | Koga et al. | 106/90 |

*Primary Examiner*—George A. Suchfield
*Attorney, Agent, or Firm*—Robert A. Kent

[57] ABSTRACT

Cementing compositions having improved fluid loss capabilities for use in oil, gas, water and other well cementing operations are disclosed. Such compositions are comprised of water, hydraulic cement and a fluid-loss additive comprising a polymerization reaction product consisting essentially of 2-acryl-amido-2-methylpropanesulfonic acid or its salts, present in the product in an amount of from about 30 to about 90 mole percent, styrene present in the product in an amount of from about 5 to about 60 mole percent and acrylic acid or its salt comprising the balance of the product.

17 Claims, No Drawings

METHOD OF REDUCING FLUID LOSS IN CEMENT COMPOSITIONS WHICH MAY CONTAIN SUBSTANTIAL SALT CONCENTRATIONS

BACKGROUND OF THE INVENTION

1. Field of the Invention

The present invention relates to an aqueous cementing composition and method of using same in cementing oil and gas wells and the like. More particularly, the present invention concerns incorporation of a polymer prepared by the polymerization of monomers or salts of monomers of 2-acrylamido-2-methylpropanesulfonic acid, styrene and acrylic acid in a hydraulic cement which may contain substantial salt concentrations for the purpose of reducing fluid loss during cementing operations.

2. Description of the Prior Art

Cement compositions are used in the oil and gas industry to cement the annular space in the wellbore between the surrounding formation and the pipe or casing. Typically the cement slurry is pumped down the inside of the casing and back up the outside of the casing through the annular space. The amount of water which is used in forming the cement slurry will vary depending upon the type of hydraulic cement selected and the job conditions at hand. The amount of water used can vary over a wide range, depending upon such factors as the required consistency of the slurry and upon the strength requirement for a particular job. Many times, the hydraulic cement must be placed within or next to a porous medium, for example earthen strata in the wellbore. When this happens, water tends to filter out of the slurry and into the strata during placement and the setting of the cement. Many difficulties are related to an uncontrolled fluid loss of this type such as an uncontrolled setting rate, improper placement of the slurry, impaired strength properties, and a contamination of the surrounding strata. These conditions are all undesirable in oil and gas well cementing operations.

Certain polymer compositions have long been recognized by those skilled in the art of cementing wells in the petroleum industry as cementing additives useful in reducing fluid loss from a slurry of cement and water to the surrounding environment, such as, the formation. These compositions are commonly referred to as "fluid loss additives".

Discussions of the use of fluid-loss additives in well cementing compositions and their importance may be found in the following articles, the disclosures of which are incorporated herein by reference:

A. Carter, Greg and Slagle, Knox, "A Study of Completion Practices to Minimize Gas Communication", Society of Petroleum Engineers Paper No. 3164, November 1970;

B. Christian, W. W., Chatterji, Jiten, and Ostroot, Warren, "Gas Leakage in Primary Cementing—A Field Study and Laboratory Investigation", Society of Petroleum Engineers Paper No. 5517, October, 1975;

C. Cook, C. and Cunningham, W., "Filtrate Control: A Key in Successful Cementing Practices", *Journal of Petroleum Technology*, August 1977, page 951;

D. Smith, Dwight, *Cementing: SPE Monograph Volume* 4, published by Millet the Printer, Inc., Dallas, Tex., 1976.

An example of a fluid loss additive for use in an acidizing or fracturing composition is found in U.S. Pat. No. 4,107,057. In the '057 patent a copolymer of a sulfonic-acid modified acrylamide and a polyvinyl cross-linking agent is employed.

In the oil well cementing art, a variety of polymers have been disclosed as useful fluid loss additives for hydraulic oil well cements. For example, U.S. Pat. No. 4,015,991 discloses such a fluid loss additive for a hydraulic cement slurry consisting of hydrolyzed copolymers of acrylamide (AM) and 2-acrylamido-2-methylpropanesulfonic acid (AMPS ®, a trademark of The Lubrizol Corporation). However, these AM/AMPS ® copolymers are useful only in operations where the bottom hole circulating temperature (BHCT) ranges from 90° to 125° F., whereas BHCT ranges encountered in such operations are often outside such a range. Still further, these copolymers have a salt tolerance of only up to about 10% by weight of water.

The temperature limitations of the AM/AMPS ® copolymers, that is, loss of usefulness above about 125° F. BHCT, are believed to be the result of hydrolysis of the amide groups. The carboxylate groups formed by such hydrolysis convert the copolymers to materials which function to retard the setting of the cement and to reduce the compressive strength of the set cement. Further, in the lower portion of the above-mentioned temperature range (between 90° and 100° F.) the AM/AMPS ® is less effective as a fluid loss additive, requiring inclusion of larger amounts of such additive than at higher temperatures. The inclusion of a sufficiently large amount of additive to create an acceptable fluid loss composition often creates viscosity and pumpability problems, since the addition of such copolymer directly affects the resultant slurry rheology. Copolymers of acrylamide and AMPS ® exhibit high viscosity and poor mixability, resulting in cement slurries having poor pumpability characteristics during cementing operations. Mixability is a subjective term used to describe how well the components in the cement composition wet and mix with each other, as well as the energy required to create a generally homogeneous slurry.

Industry desires a fluid loss additive that has as little effect on compressive strength, set time, viscosity and thickening time as possible; is salt tolerable, that is, does not exhibit substantial loss of effectiveness in the presence of salt; and is chemically stable during cementing operations. Further, such desired fluid loss additive should be compatible with as many other additives and environmental conditions as possible, should be soluble in cement slurries at normal ambient temperatures encountered in oil well cementing operations, as well as continue to provide fluid-loss characteristics over a broad temperature range and at the high pH of the cementing compositions.

U.S. Pat. No. 4,515,635 discloses the use of copolymers of N,N-dimethylacrylamide (NNDMA) and AMPS ® having monomer ratios of NNDMA to AMPS ® of 1:4 to 4:1 and selected molecular weights as fluid loss additives for cement compositions. As illustrated in the patent, however, the copolymer fails to provide desired levels of fluid loss control even at relatively high concentrations to cements containing substantial salt concentrations.

It would be desirable to provide additives for use in reducing fluid loss in cement compositions, and particularly, those containing substantial salt concentrations where the bottom hole circulating temperatures may range from about 100° F. to in excess of about 400° F. without adversely affecting thickening time, compressive strength or other properties of the cement composition.

SUMMARY OF THE INVENTION

Cementing compositions having improved fluid loss capabilities for use in elevated temperature environments in oil, gas and water well cementing operations are disclosed. More particularly, such compositions are comprised of water, hydraulic cement and a fluid-loss additive comprising a polymer prepared by polymerization of 2-acrylamido-2-methylpropanesulfonic acid (hereinafter referred to as AMPS®), styrene and acrylic acid or their salts.

In one composition of the fluid-loss additive of the present invention, the AMPS® is present in an amount of from about 30 to about 90 mole percent, the styrene is present in an amount of from about 5 to about 60 mole percent and the acrylic acid is present in an amount of from about 5 to about 30 mole percent.

The polymers and salts of the polymers comprising the fluid-loss additive used in the present invention are relatively stable to hydrolysis over a wide range of temperature and pH. Such polymers and salts of the polymers may be admixed in solid form with any dry hydraulic oil field cement or may be added at the time the cement slurry is being prepared, either to the mixing water or to the slurry. Additionally, methods of cementing a conduit in a borehole penetrating an earthen formation by introducing such a cementing composition into the space between such conduit and formation are disclosed.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

New cementing compositions and methods of using same methods in oil, gas and water well cementing operations are disclosed. Such compositions are comprised of an aqueous fluid, hydraulic cement and a polymer comprising the reaction product of the polymerization of AMPS®, styrene and acrylic acid or their salts.

The AMPS® is present in the polymerization reaction product in acid or salt form in an amount of from about 30 to about 90 mole percent, the styrene is present in an amount of from about 5 to about 60 mole percent and the acrylic acid is present in an amount of from about 5 to about 30 mole percent.

In a preferred composition of the fluid-loss additive, the AMPS® comprises from about 40 to about 70 mole percent, the styrene comprises from about 10 to about 60 mole percent and the acrylic acid comprises from about 5 to about 20 mole percent of the polymerization reaction product.

In a most preferred composition of the fluid-loss additive, the AMPS® comprises from about 40 to about 60 mole percent, the styrene comprises from about 30 to about 40 mole percent and acrylic acid comprises from about 10 to about 20 mole percent of the polymer. Such composition corresponds to a molar ratio of AMPS®:styrene:acrylic acid in the range of from 4:4:2 to about 6:3:1. Numerous salts of the polymer can be prepared. The preferred salts being made by neutralization of the acid form of the AMPS® or acrylic acid monomer or the polymers with an alkaline agent such as a source of sodium, calcium, magnesium, ammonium ions or the like. Such alkaline agents can comprise, for example, sodium hydroxide, calcium hydroxide, ammonium hydroxide, magnesium hydroxide and the like.

Although the amount of the fluid-loss additive admixed with the cement may be varied, the polymer generally is admixed with the cementing composition in an amount of from about 0.25 to about 5 percent by weight of the cement. Preferably, the fluid-loss additive is admixed with the cement in an amount of from about 0.5 to about 1.5 percent by weight of dry cement. When the aqueous fluid utilized to prepare the cement comprises substantially fresh water, the concentration preferably is in the range of from about 0.5 to about 1 percent by weight of dry cement. When salt is present, the fluid-loss additive preferably is present in an amount of from about 1.0 to about 1.5 percent by weight of dry cement. While it is to be understood that larger quantities of the fluid-loss additive can be utilized, such use is economically undesirable.

The cementing compositions of the present invention are useful in oil, gas and water well cementing operations since such compositions have reduced fluid loss to the surrounding formation. Such compositions are used to cement a conduit penetrating a permeable earthen formation via introducing such composition into the space between such conduit and such formation and allowing the composition to harden.

The polymers and salts of the polymers used in the present invention may be manufactured in accordance with various well known free-radical techniques. In one laboratory method of preparation, the AMPS® and acrylic acid are mixed with deionized water and neutralized with an alkaline agent comprising, for example, a 50% solution of sodium hydroxide to form an aqueous phase. Styrene and a surfactant comprising, for example, sorbitan mono-oleate are mixed with ISOPAR-M, a highly refined isoparaffinic hydrocarbon oil manufactured by Exxon Company U.S.A. to form an oil phase. The surfactant is present in an amount of about 6 percent by weight of the reactants. The aqueous phase then is admixed with the oil phase to form an emulsion in a nitrogen purged reactor vessel. The vessel is heated to about 70° C. in a water bath. After the air present in the reactor vessel has been purged by the nitrogen gas, a polymerization initiator comprising, for example, 2-2'-azo-bis-isobutyronitrile is added to the emulsion in an amount of about 0.5 percent by weight of the reactants. Upon completion of the polymerization reaction, the polymer is separated from the emulsion by precipitation with acetone. The salts of the polymer can be formed by well known techniques. The salts may be formed, for example, during the polymerization process by neutralization of the acid forms of AMPS® or acrylic acid. The salts may be formed with any alkaline agent which does not adversely react with the monomers of the polymer or the other constituents of the cementing composition.

The term "cement" as used herein is intended to include those compounds of a cementitious nature which are described as hydraulic cements. Such compounds include, for example, Portland Cement in general and particularly Portland Cements of API Classes G and H, although other API classes can be utilized, pozzolan cements, gypsum cements, high alumina content cements, high gel (high clay content) cements, silicate containing cements and high alkalinity cements can be used in various applications of the present invention. Portland cements and particularly cements of API Classes G and H are preferred.

The aqueous fluid utilized in the cement composition can be water from any source provided that it does not contain an excess of any compounds that affect the stability of the cement composition of the present invention. The aqueous fluid can contain various salts such as sodium chloride, potassium chloride, calcium chloride and the like. Depending upon the particular cement slurry being formed and the intended conditions of use, the aqueous fluid is utilized in the cementing composition in an amount of from about 150 to about 30 percent by weight of dry cement. Preferably, the aqueous fluid is present in an amount in the range of from about 50 to about 35 percent by weight of dry cement.

Other well known and conventional additives also can be incorporated into the cement composition to modify the properties of the composition. Such additives include additional fluid loss additives or viscosifiers, retarders, accelerators, dispersants, weight-adjusting materials or fillers and the like.

Additional fluid-loss additives which may be incorporated into the cement composition of the present invention include cellulose derivatives such as carboxymethylhydroxyethyl cellulose, hydroxyethyl cellulose, modified polysaccharides, polyacrylamides polyaromatic sulfonates, guar gum derivatives, mixtures of such compounds and the like. Numerous other compounds which may be utilized as additional fluid loss additives are well known by those skilled in cementing technology.

A retarder may be used in the cementing composition when the bottom hole circulating temperature exceeds 100° F. Retarders satisfactory for use in the present invention include those commercially available products commonly utilized as retarders. Examples of retarders which can be used to carry out the invention include lignosulfonates, such as calcium lignosulfonate and sodium lignosulfonate, organic acids such as tartaric acid and gluconic acid and mixtures thereof. The amount of retarder required will vary according to the bottom hole circulating temperatures and variations in the makeup of the cement itself. The proper amount of retarder required in any particular case should be determined by running a "thickening time" test for the particular concentration of retarder and cement composition being used. Such tests should be run according to the procedures set by API SPEC 10. Generally speaking, "thickening time" is defined in API SPEC 10 as the elapsed time from the time pumping begins until the cement reaches from about 70 to 100 units of consistency. In most applications the amount of retarder, if any, required will not exceed more than about 5.0 percent by weight of the cement composition.

Dispersing agents can be utilized to facilitate using lower quantities of water and to promote higher set cement strength. Friction reducers which promote freer movement of the unset composition, and allow ease of pumping through the annulus, if present, can be incorporated in the slurry in amounts up to about several percent by weight of dry cement. Some dual function additives, such as lignosulfonates which function both as a dispersant and also as a set time retarder, can be incorporated in the slurry where their use would be advantageous for certain cementing situations.

Accelerators, such as the soluble inorganic salts in addition to calcium chloride, can be utilized up to about 8 percent by weight of cement.

The cement composition also may include, in particular applications, foaming agents or defoaming agents which comprise various anionic cationic, nonionic and other surface active compounds. The amount of such surface active agents added to the cement composition will typically be in the range of from about 0.1 to about 3 percent by weight of cement. Generally, the selection of such additives will be within the skill of those knowledgeable in cement technology.

Of the various types of fine aggregate or particulate filler materials which can be used, fly ash, silica flour, fine sand, diatomaceous earth, lightweight aggregate and hollow spheres can be cited as typical. The use of these materials is well understood in the art, and so long as they are compatible with the compositions of the invention, they can be employed over wide ranges of concentration.

To illustrate the unique benefits of the method of the present invention and not by way of limitation, the following examples are presented.

EXAMPLE I

The following test was performed to determine the utility of the composition of the present invention as a fluid-loss additive in a cementing composition.

Cement compositions are prepared having the proportions of class H cement, mixing water, fluid-loss additive and salt (sodium chloride) content as set forth in the following Table. The fluid-loss additive had the mole percent ratio set forth in Table I. The tests were performed by placing the cement compositions in an atmospheric consistometer which was preheated to test temperature and stirred for twenty minutes. The atmospheric consistometer is a nonpressurized device that simulates a cementing pumping process via movement of the consistometer can about a paddle. Temperature can be varied, but pressure is atmospheric. Fluid loss then is measured at 1000 psi through a 325 mesh screen on the U.S. Sieve Series in cc/30 minutes. The foregoing test procedure is more fully outlined in API Spec 10, Second Edition, June 15, 1984, entitled *API Specification for Materials and Testing for Well Cements* which is incorporated herein by reference. The results of these fluid-loss tests are provided in Table I. The consistency of the cement composition is measured in terms of Bearden units of consistency (Bc). A pumpable cement slurry should measure in the range of from about 2–20 Bc and preferable be in the range of from about 12–15 Bc. Cement slurries thicker than 12-15 Bc become increasingly difficult to mix and pump into a subterranean formation. Slurries thinner than 4–5 Bc will tend to have greater particle settling and free water generation which is generally undesirable.

TABLE I

| Sample No. | Mix Water, % by wt. dry cement | Salt % by wt. of mix water | Fluid-loss additive, % by wt. dry cement | AMPS ®/styrene/ acrylic acid ratio, mole percent | Test temperature °F. | Consistometer reading, Bc 0 min | Consistometer reading, Bc 20 min | Fluid-loss in cc/30/min., 1000 psi and 325 mesh screen |
|---|---|---|---|---|---|---|---|---|
| 1 | 38 | 18 | 1.0 | 75/20/5 | 140 | 8 | 20 | 228 |
| 2 | 38 | 10 | 1.0 | 75/20/5 | 140 | 10 | 15 | 46 |
| 3 | 38 | 0 | 1.0 | 75/20/5 | 140 | 11 | 10 | 25 |
| 4 | 38 | 3 (KCl) | 0.5 | 75/20/5 | 140 | 7 | 7 | 137 |
| 5 | 38 | 0 | 1.0 | 32/58/10 | 125 | 7 | 8 | 90 |
| 6 | 38 | 18 | 1.0 | 32/58/10 | 125 | 5 | 10 | 203 |
| 7 | 38 | 0 | 1.0 | 47/43/10 | 125 | 8 | 8 | 37 |
| 8 | 38 | 18 | 1.0 | 47/43/10 | 125 | 7 | 11 | 120 |
| 9 | 38 | 37.2 | 1.0 | 47/43/10 | 125 | 7 | 14 | 388 |
| 10 | 38 | 0 | 0.5 | 56/34/10 | 125 | 6 | 7 | 124 |
| 11 | 38 | 0 | 1.0 | 56/34/10 | 125 | 10 | 10 | 24 |
| 12 | 38 | 18 | 1.0 | 56/34/10 | 125 | 6 | 13 | 107 |
| 13 | 38 | 18 | 1.0 | 64/36/0 | 140 | 12 | 30 | 548 |
| 14 | 38 | 18 | 1.0 | 65/35/0 | 140 | 14 | 34 | 490 |

EXAMPLE II

The procedure of Example I was utilized to test the composition of the present invention in comparison to the individual constituents of the fluid loss additive. The results of the tests are set forth in Table II. The class H cement utilized in the performance of the following tests was from a different batch than that of Example I.

TABLE II

| Sample No. | Mix Water, % by wt. dry cement | Salt % by wt. of mix water | Fluid-loss additive, % by wt. dry cement | AMPS ®/styrene/ acrylic acid ratio, mole percent | Test temperature, °F. | Consistometer reading, Bc 0 min | Consistometer reading, Bc 20 min | Fluid-loss in cc/30 min., 1000 psi and 325 mesh screen |
|---|---|---|---|---|---|---|---|---|
| 1 | 38 | 18 | 1.0 | 56/34/10 | 125 | 15 | 12 | 32 |
| 2 | 38 | 18 | 1.0 | 100/0/0[1] | 125 | 27 | 23 | 181 |
| 3 | 38 | 18 | 1.0 | 0/100/0 | 125 | 3 | 10 | 1180 |
| 4 | 38 | 18 | 1.0 | 0/0/100 | 125 | 3 | 7 | 1500 |
| 5 | 38 | 18 | 1.0 | 56/34/10[2] | 125 | 17 | 23 | 250 |

[1]AMPS ® comprised the product identified as Lubrizol 2420, a polyamps having a molecular weight of 3 to 4 million marketed by The Lubrizol Corporation for use as a fluid loss additive.
[2]A physical admixture of three homopolymers of AMPS ®, styrene and acrylic acid in the molar ratio 56/34/10

The foregoing fluid-loss data of Examples I and II clearly illustrates the effectiveness of the composition of the present invention at reducing fluid-loss from cementing compositins containing significant salt concentrations in contrast to less effective additives not containing all of the constituents of the polymerization reaction product comprising the fluid loss additive of the present invention.

While that which is considered to be the preferred embodiment of the invention has been described hereinbefore, it is to be understood that modifications and changes can be made in the method of the present invention without departing from the spirit or scope of the invention as set forth in the following claims.

What is claimed is:

1. A method of cementing a conduit in a borehole penetrating an earthen formation by introducing a cementing composition into the space between said conduit and said formation, said cementing composition comprising:
   cement;
   an aqueous fluid, and
   a fluid-loss additive comprising a polymer or polymer salt of 2-acrylamido-2-methylpropanesulfonic acid, styrene and acrylic acid, said 2-acrylamido-2-methylpropanesulfonic acid or salt thereof being present in an amount of from about 30 to about 90 mole percent, said styrene being present in an amount of from about 5 to about 60 mole percent and said acrylic acid or salt thereof being present in an amount of from about 5 to about 30 mole percent of said polymer.

2. The method of claim 1 wherein said 2-acrylamido-2-methylpropanesulfonic acid or salt thereof is present in an amount of from about 40 to about 70 mole percent, said styrene is present in an amount of from about 10 to about 60 mole percent and said acrylic acid or salt thereof is present in an amount of from about 5 to about 20 mole percent of said polymer.

3. The method of claim 1 wherein said 2-acrylamido-2-methylpropanesulfonic acid or salt thereof is present in an amount of from about 40 to about 60 mole percent, said styrene is present in an amount of from about 30 to about 40 mole percent and said acrylic acid or salt thereof is present in an amount of from about 10 to about 20 mole percent of said polymer.

4. The method of claim 1 wherein said fluid loss additive is present in said cementing composition in an amount of from about 0.25 percent to about 5 percent by weight of the dry cement.

5. The method of claim 1 wherein said fluid loss additive is present in said cementing composition in an amount of from about 0.5 percent to about 1 percent by weight of the dry cement.

6. A method of cementing a conduit penetrating a permeable earthen formation comprising:
   introducing a cementing composition into the space between said conduit and said formation, said cementing composition comprising:
   cement,
   an aqueous fluid, and
   a fluid-loss additive comprising a polymer of 2-acrylamido-2-methylpropanesulfonic acid, styrene and acrylic acid or their salts, said 2- acrylamido-2-methylpropanesulfonic acid or its salt being present in an amount of from about 30 to about 90 mole percent, said styrene being present in an amount of from about 5 to about 60 mole percent and said acrylic acid being present in an amount of from about 5 to about 30 mole percent of said polymer; and allowing said cementing composition to set within said space.

7. The method of claim 6 wherein said aqueous fluid contains dissolved salts.

8. The method of claim 6 wherein said 2-acrylamido-2methylpropanesulfonic acid or salt thereof is present in an amount of from about 40 to about 60 mole percent, said styrene is present in an amount of from about 30 to about 40 mole percent and said acrylic acid or salt thereof is present in an amount of from about 10 to about 20 mole percent of said polymer.

9. The method of claim 6 wherein said fluid loss additive is present in said cementing composition in an amount of from about 0.25 percent to about 5 percent by weight of the dry cement.

10. The method of claim 6 wherein said fluid loss additive is present in said cementing composition in an amount of from about 0.5 percent to about 1.5 percent by weight of the dry cement.

11. The method of claim 6 wherein said polymer salts are formed by reaction of the reactive polymer units individually or as a polymer with an alkaline agent capable of producing a salt containing ions of at least one member selected from the group consisting of sodium, calcium, magnesium and ammonium ions.

12. The method of cementing a conduit penetrating a permeable earthen formation comprising:

introducing a cementing composition into the space between said conduit and said formation, said cementing composition comprising:
cement,
an aqueous fluid containing dissolved salt,
a fluid-loss additive comprising a polymer comprising:
2-acrylamido-2-methylpropanesulfonic acid or its salts, styrene and acrylic acid or its salts, the molar ratio of said 2-acrylamido-2-methylpropanesulfonic acid to said styrene to said acrylic acid being in the range of from about 4:4:2: about 6:3:1; and allowing said cementing composition to set within said space.

13. The method of claim 12 wherein said polymer salts are formed by reaction of the reactive polymer units individually or as a polymer with an alkaline agent capable of producing a salt containing ions of at least one member selected from the group consisting of sodium, calcium, magnesium and ammonium ions.

14. The method of claim 12 wherein said fluid-loss additive is present in said cementing composition in an amount of from about 0.25 percent to about 5 percent by weight of the dry cement.

15. The method of claim 12 wherein said fluid-loss additive is present in said cementing composition in an amount of from about 0.5 percent to about 1 percent by weight of the dry cement.

16. The method of claim 12 wherein said dissolved salts are present in an amount of at least 18 percent by weight of said aqueous fluid.

17. The method of claim 12 wherein said 2-acrylamido-2methylpropanesulfonic acid or salt thereof is present in an amount of from about 40 to about 60 mole percent, said styrene is present in an amount of from about 30 to about 40 mole percent and said acrylic acid or salt thereof is present in an amount of from about 10 to about 20 mole percent of said polymer.

* * * * *